United States Patent
Carmel et al.

(10) Patent No.: US 8,856,021 B2
(45) Date of Patent: Oct. 7, 2014

(54) SCORING OF CROWD-COMPUTING INPUTS

(75) Inventors: David Carmel, Haifa (IL); Ido Guy, Haifa (IL); Dafna Sheinwald, Nofit (IL); Itai Turbahn, Haifa (IL)

(73) Assignee: International Business Machines Corporation, Armonk, NY (US)

(*) Notice: Subject to any disclaimer, the term of this patent is extended or adjusted under 35 U.S.C. 154(b) by 539 days.

(21) Appl. No.: 13/158,425

(22) Filed: Jun. 12, 2011

(65) Prior Publication Data

US 2012/0316889 A1 Dec. 13, 2012

(51) Int. Cl.
*G06Q 10/00* (2012.01)
*G06Q 10/10* (2012.01)
*G06Q 30/02* (2012.01)

(52) U.S. Cl.
CPC ............. *G06Q 10/10* (2013.01); *G06Q 10/101* (2013.01); *G06Q 30/0206* (2013.01); *G06Q 30/0201* (2013.01)
USPC ........................................ 705/7.35; 705/300

(58) Field of Classification Search
CPC ......................... G06Q 30/0206; G06Q 10/101
USPC ................................... 705/7.35, 300
See application file for complete search history.

(56) References Cited

U.S. PATENT DOCUMENTS

2012/0278825 A1* 11/2012 Tran et al. .................... 725/13
2013/0204652 A1* 8/2013 Marins et al. ................ 705/7.15

OTHER PUBLICATIONS

Salz, Peggy Anne, "Teams Work: Social Search Gets Results," EContent, Nov. 2007, 30, 9, pp. 34-38 and 40.*
Colin Stanley, "A New Team-Based Crowdsourcing Tool Emerges from Testing", URL: http://dailycrowdsource.com, Oct. 3, 2010. Publisher: The Daily Crowd Source.
Ramon Youseph, "Google and Crowdsourcing Unite for Web Cleanup", URL: http://dailycrowdsource.com, Nov. 19, 2010. Publisher: The Daily Crowd Source.

* cited by examiner

*Primary Examiner* — Nathan Erb

(57) ABSTRACT

Method, system, and computer program product are provided for scoring of crowd-computing inputs. A group of data is provided to crowd-computing participants and the participants are requested to provide candidate members or the group of data. The computer-implemented method performed includes: receiving an input by a participant, wherein the input is a candidate member; counting multiple inputs of the same candidate member by participants; validating a candidate member; rewarding the participants inputting the candidate member, with a higher reward for participants who input the candidate member earlier than other participants; and supplying the rewards to participants once the candidate member has been validated.

16 Claims, 4 Drawing Sheets

SCORING OF CROWD-COMPUTING INPUTS

BACKGROUND

This invention relates to the field of crowd-computing. In particular, the invention relates to scoring of crowd-computing inputs.

Crowd-computing is a mechanism for accumulating (tacit) knowledge from the crowd. Typically in crowd-computing mechanisms, participants are asked to carry out a (usually simple and easy) task for a reward. The reward may be by an explicit wage (e.g. Amazon Mechanical Turk (MT) https://www.mturk.com/mturk/welcome, Amazon and Mechanical Turk are trade marks of Amazon.com, Inc.), artificial rewards (points, stars, etc.) or just by fun through playing a game with others (e.g. Google Image Labeler, Google and Image Labeler are trade marks of Google, Inc.).

Enclosed is a list of some crowd-computing tasks published on MT:
  Evaluate Search Results;
  Select the best category for a product;
  Hunt for Web Addresses of Restaurants;
  Write a quick comment on a short blog entry;
  Provide important historical dates;
  Simply Search Google for a Phrase and Click a Specific Link.

The crowd-computing task of naming members of a given group is focused on in which there are large groups for which no comprehensive member list exists. For example, the group of all restaurant home-pages, historical dates, or German names. The aim is to obtain a wide coverage of the group by obtaining as many members of the group as possible. However, some level of awareness is required of the crowd of an item's membership, in other words, a level of agreement on that membership relationship.

A naive solution is provided using crowd-computing in which a requester asks the crowd (the workers or participants) to provide members of a given group they are familiar with, while paying each worker according to the number of (distinct) members he provides. Usually, the payment policy is simple—workers are rewarded a fixed wage per provided item. Hence, denoting the wage offered for each input item by K, and the total number of input items received by N, the requester pays a total of N*K, while each worker who provided n items is paid n*K.

BRIEF SUMMARY

According to a first aspect of the present invention there is provided a computer-implemented method for scoring of crowd-computing inputs performed by a computerized device, comprising: receiving an input by a participant, wherein the input is a candidate member; counting multiple inputs of the same candidate member by participants; validating a candidate member; rewarding the participants inputting the candidate member, with a higher reward for participants who input the candidate member earlier than other participants; and supplying the rewards to participants once the candidate member has been validated.

According to a second aspect of the present invention there is provided a computer program product for scoring of crowd-computing inputs, the computer program product comprising: a computer readable non-transitory storage medium having computer readable program code embodied therewith, the computer readable program code comprising: computer readable program code configured to: receiving an input by a participant, wherein the input is a candidate member; counting multiple inputs of the same candidate member by participants; validating a candidate member; rewarding the participants inputting the candidate member, with a higher reward for participants who input the candidate member earlier than other participants; and supplying the rewards to participants once the candidate member has been validated.

According to a third aspect of the present invention there is provided a system for scoring of crowd-computing inputs, comprising: a processor; an input receiver for receiving an input by a participant, wherein the input is a candidate member; a counting component for counting multiple inputs of the same candidate member by participants; a validating component for validating a candidate member; a reward component for rewarding the participants inputting the candidate member, with a higher reward for participants who input the candidate member earlier than other participants; and a reward supply component for supplying the rewards to participants once the candidate member has been validated.

According to a fourth aspect of the present invention there is provided a method of providing a service to a customer over a network for scoring of crowd-computing inputs, the service comprising: receiving an input by a participant, wherein the input is a candidate member; counting multiple inputs of the same candidate member by participants; validating a candidate member; rewarding the participants inputting the candidate member, with a higher reward for participants who input the candidate member earlier than other participants; and supplying the rewards to participants once the candidate member has been validated.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

Figure 1:
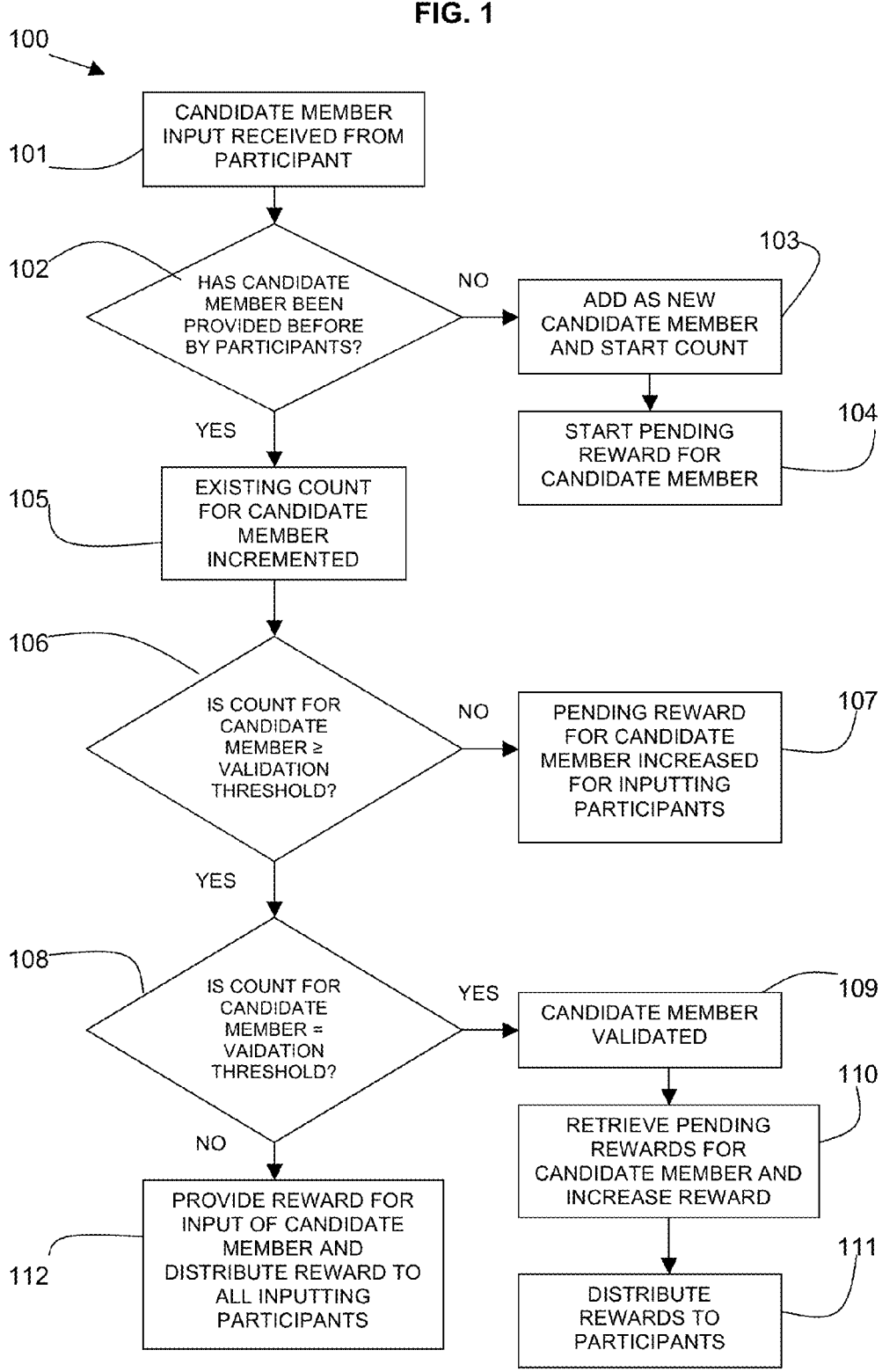
FIG. 1 is a flow diagram of a method in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Method, system and computer program product are described for a crowd-computing task of naming members of a given group. In particular, for naming members of large groups for which no comprehensive member list exists. The aim is to obtain a wide coverage of the group by obtaining as many members of the group as possible and in which a payment policy encourages participants to provide comprehensive and reliable enumeration of group members.

The described solution may pay for each provided correct answer a reward of size K, thus the system pays K*N for a total of N correct answers, similarly to the naive approach described above (which pays for all answers, not only correct ones). The payment K for a correct answer is split among the provider, as well as all participants who already provided that answer, such that the first provider of an answer is rewarded the most. In doing so, the solution encourages innovation as the optimal strategy for participants is to propose new member items that have not been suggested before.

In addition, an example validation mechanism is described. A threshold $v \geq 1$ may be set which announces a candidate member as a validated member only if provided by at least v participants. The payment policy may condition the reward on validation; i.e., payment is delayed until a validation arrives. In doing so, participants are encouraged to propose only correct items that are likely to be validated (proposed) by others. Participants are dissuaded from providing wrong answers, as those answers will not be validated.

Participants are motivated to be innovative as a user who suggests an item early is rewarded for any repetition of this answer by others.

Consequently, the reward policy described drives a desirable behavior of the crowd, while using the same resources for a crowd-computing mechanism. Namely, the same total wage is paid; however, the described policy drives the crowd to generate much more reliable and comprehensive knowledge.

Referring to FIG. 1, a flow diagram 100 shows an embodiment of the described method of scoring a crowd-computing input. A candidate member input is received 101 from a participant. It may be determined 102 if the candidate member has been provided before by other participants. If it has not been provided before, it may be added 103 as a new candidate member and a count may be started. A pending reward for the new candidate member may be started 104 which will be rewarded to the current inputting participant and further participants inputting this candidate member.

If the candidate member has been provided before, the existing count for the candidate member may be incremented 105. It may then be determined 106 if the count for the candidate member is greater than or equal to a threshold count for validating a candidate member. If the count is below the threshold, a pending reward for the participants inputting the candidate member may be increased 107 for an amount for the current input.

If the count is greater than or equal to the threshold count, it may be determined 108 if the count is equal to the threshold. If so, the candidate member may be validated 109 and the pending rewards for the candidate member may be retrieved 110 and increased for the current input. The pending rewards may then be distributed 111 to the participants who input the candidate member previously and the current participant.

If the count is greater than the threshold count, then all pending rewards will have already been distributed, and a reward for the current submission may be made and distributed 112 to the current participant and all previous participants who provided the candidate member.

In one embodiment, a reward is made at each instance of a participant providing a candidate member, with the reward divided between the current participant and the previous participants who provided that candidate member. The reward may be divided equally, or with a factor providing more reward for earlier participants.

Figure 2:
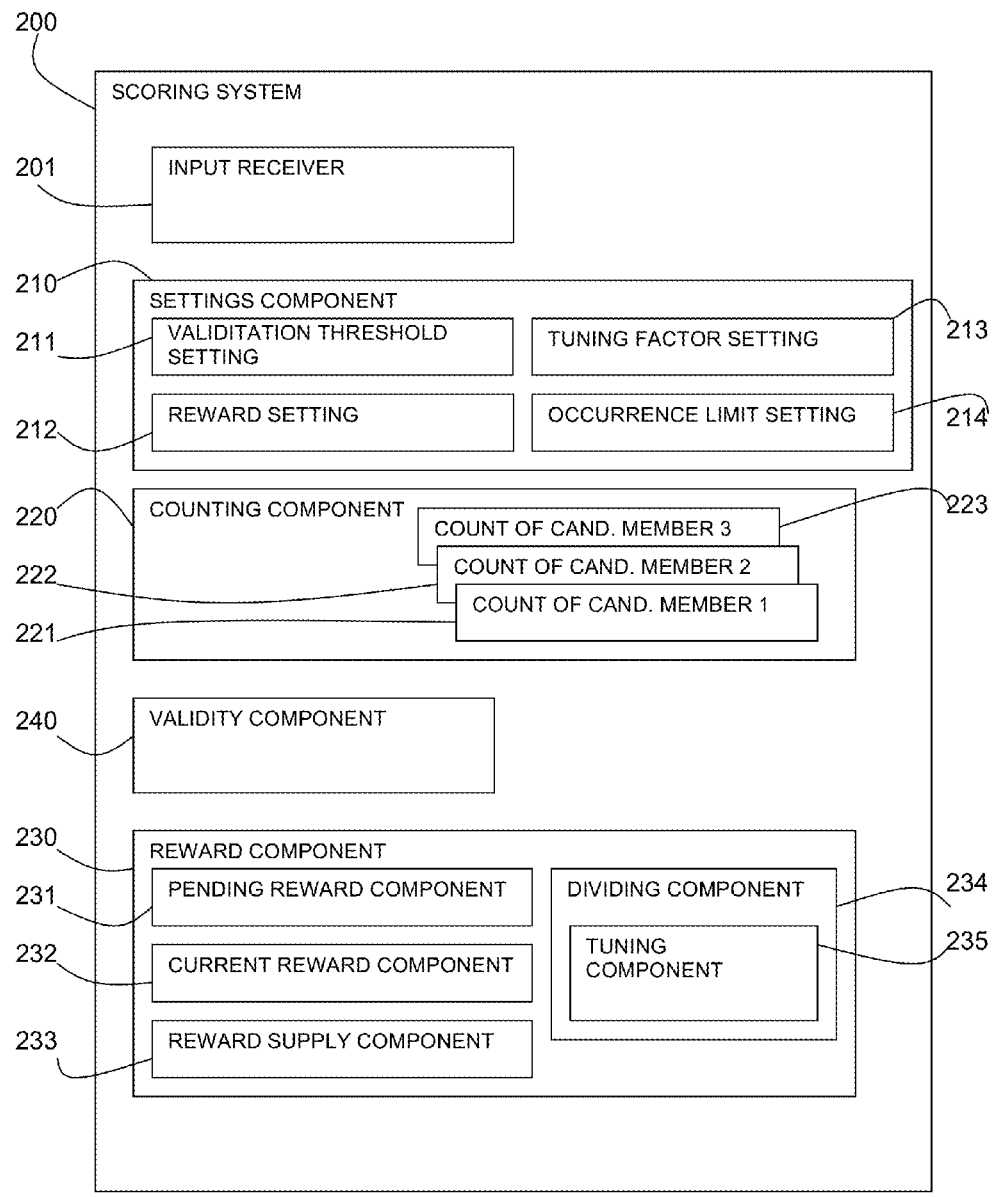
FIG. 2 is a block diagram of a system in accordance with the present invention.

Referring to FIG. 2, a block diagram shows an example embodiment of a scoring system 200 for scoring of crowd-computing inputs. The scoring system 200 may be provided at a server hosting a crowd-computing mechanism, with the scoring system 200 scoring inputs by participant clients.

A scoring system 200 may include an input receiver 201 for receiving an input in the form of a candidate member from a participant.

The scoring system 200 may include a settings component 210. The settings component 210 may include: a validation threshold setting 211 for setting a threshold number of occurrences of a candidate member input for the input to be validated; a reward setting 212 which may set a reward amount per occurrence of a candidate member input to be shared between all participants who have provided the candidate member input; a tuning factor setting 213 for optionally tuning earlier participants' rewards; and an occurrence limit setting 214 for optionally setting a limit on the number of occurrences for which a reward is made.

A counting component 220 may be provided for comparing an input candidate member to previously input candidate members and maintaining counts 221-223 for input candidate members. A count may be increased every time a new input of a candidate member is received.

A validating component 240 may be provided for determining if a candidate member has been received a threshold number of times by participants.

A reward component 230 may be provided for rewarding participants. The rewards may be monetary, credit, artificial rewards such as points, or other forms of reward to a participant. The reward component 230 may include a pending reward component 231 for storing a count of pending rewards due to previously inputting participants if their candidate member is validated. The reward component 230 may also include a current reward component 232 for providing rewards to participants once an input candidate member has been validated.

The reward component 230 may include a reward supply component 233 for providing the rewards to the participants once a candidate member is validated and after additional receipt of a validated candidate member.

The reward component 230 may also include a dividing component 234 for dividing a reward amount as specified in the reward setting 212 between the current inputting participant and any previously inputting participants of a candidate member. A tuning component 235 may be provided for applying a tuning factor 213 as set in the setting to determine the division of the reward between the participants. For example, the tuning component 235 may provide a factor by which the earlier inputting participants of a candidate member receive a higher amount of the divided reward than later inputting participants.

Figure 3:
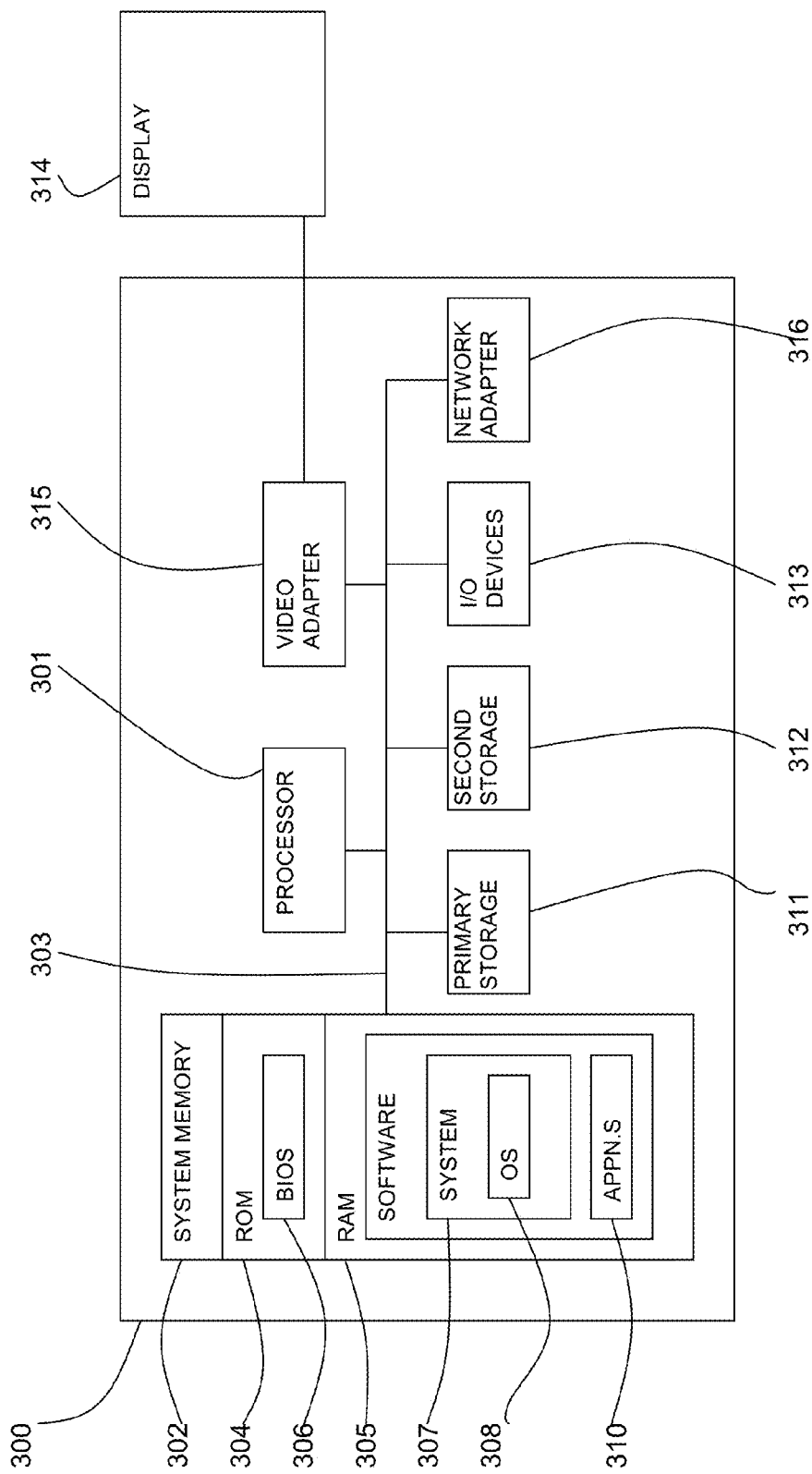
FIG. 3 is a block diagram of a computer system in which the present invention may be implemented.

Referring to FIG. 3, an exemplary system for implementing aspects of the invention includes a data processing system 300 suitable for storing and/or executing program code including at least one processor 301 coupled directly or indirectly to memory elements through a bus system 303. The memory elements can include local memory employed during actual execution of the program code, bulk storage, and cache memories which provide temporary storage of at least some program code in order to reduce the number of times code must be retrieved from bulk storage during execution.

The memory elements may include system memory 302 in the form of read only memory (ROM) 304 and random access memory (RAM) 305. A basic input/output system (BIOS) 306 may be stored in ROM 304. System software 307 may be stored in RAM 305 including operating system software 308. Software applications 310 may also be stored in RAM 305.

The system 300 may also include a primary storage means 311 such as a magnetic hard disk drive and secondary storage means 312 such as a magnetic disc drive and an optical disc drive. The drives and their associated computer-readable media provide non-volatile storage of computer-executable instructions, data structures, program modules and other data for the system 300. Software applications may be stored on the primary and secondary storage means 311, 312 as well as the system memory 302.

The computing system 300 may operate in a networked environment using logical connections to one or more remote computers via a network adapter 316.

Input/output devices 313 can be coupled to the system either directly or through intervening I/O controllers. A user may enter commands and information into the system 300 through input devices such as a keyboard, pointing device, or other input devices (for example, microphone, joy stick, game pad, satellite dish, scanner, or the like). Output devices may include speakers, printers, etc. A display device 314 is also connected to system bus 303 via an interface, such as video adapter 315.

As stated above, by the described policy, the first participant, P1, to suggest a new member candidate, m, is rewarded more than the other participants that provide the same candidate. Moreover, P1 is rewarded only once m is validated by way of other participants that have suggested m after P1.

A first example embodiment of the policy is described further through the following formula.

Set a validation threshold $v \geq 1$. Let $P_1, \ldots P_i$ denote the sequence of participants that provide candidate m, in this order ($P_j$ provides m after $P_{j-1}$).

The i-th participant $P_i$, $i \geq v$, to provide member m is rewarded K/i. Once this happens, each of the i−1 participants who have already provided m gets rewarded K/i too.

For $1 \leq i < v$, a reward of K/i is registered for $P_i$, but remains pending until v participants have provided m. That is, the reward is only materialized for $P_i$ once $P_v$ provides member m.

Formally, once m is provided for the i-th time, $P_j$, for j=1, 2, ... i, is rewarded with:
- 0 plus a pending reward of K/i for i<v
- K/j+K/(j+1)+...+K/i for i=v (materializing all the pending rewards)
- K/i for i>v In the formula above, j plays the role of the first, second, third participants up to the i-th participant when m is provided for the i-th time. In this way, i enumerates the provision, and for each provision, $j \leq i$ enumerates all those rewarded by more than 0.

Each provision of a candidate m releases a total reward K over all the participants who previously and currently provided the candidate m. The total reward K released for the i-th provision of the candidate m is equally divided among $P_1 \ldots P_i$. If i is less than the threshold v, the reward is kept pending until the v-th provision of the candidate m, and then materialized. Hence, if i=4, i.e. the fourth participant has provided the candidate m, then the first, second, third and fourth participants each get K/4.

Properties of this example formula:
(1) The system pays a total amount of K per each provision of member name m, which is already or eventually verified, independently of who provides m, or how many times m repeats. In this sense, the policy resembles the known reward policy described in the background art. The difference, from the system perspective, is that candidates who are proposed less than v times are not rewarded at all by the described policy.
(2) At any given time after m has been proposed for at least v times, the total compensation for m that $P_j$ has received exceeds the total compensation for m that $P_i$ has received, for j<i. The difference in the total compensation for m is sum_$\{j<k \leq i\}$ $\{1/k\}$. Namely, the earlier candidate m is proposed the larger reward the proposer gains.
(3) The total compensation that $P_i$ receives for m is unbounded. It grows without converging with each provision of m by any other participant.

Properties (2) and (3) motivate participants to innovate, but remain within reasonable domains, so that their innovation proves to be acceptable (with high probability to be renamed).

In a worked example, a second participant to provide candidate member m (lets call him John) receives K/2 either once he provides m or later when m is validated by means of being provided for v times. John then receives K/3 when m is provided for the 3-rd time, then K/4, then K/5, etc. This may continue without end so that John continues to be rewarded as long as new inputs of m are received. So the total reward John receives for the provisions of m is K/2+K/3+K/4+K/5+ ... etc. growing as long as m is provided. The sum of this sequence does not converge.

The above properties are not necessary conditions for the requested motivation. For example, there may be schemes in which the total compensation does converge after enough provisions of same candidate name. For example, the provider for the i-th time, $P_i$, gets K/2, $P_{\{i-1\}}$ gets K/4, $P_{\{i-2\}}$ gets K/8, $P_{\{i-3\}}$ gets K/16, etc. A converging reward may be provided as the sum of K/2+K/4+K/8+K/16+ ... which converges to K. After a long enough time, the total compensation for m, for each of the participants converges to K.

In another case, for example, the total compensation that $P_i$ receives for m may be bounded with a set finite number of occurrences required before the reward ceases. A limit may be set for when the reward will cease to be given, for example, when 20 or 100 participants have provided the same answer.

A second example embodiment, maintains non-convergence of total compensation, while giving more control to the system over the relative compensation between the different proposers.

In this embodiment, the amount K of the reward is not equally split among all participants that have named m thus far. Rather, K is split according to the order in which the participants mentioned m, so that for $j<i$, $P_j$ is rewarded more than $P_i$.

This variation, which favours $P_j$ over $P_i$ for $j<i$ even more than originally, can be used by the system when the stream of new names starts to fade. It drives finding of more new names and fast, short, validations for them.

In one embodiment, a parameter $\alpha$ (alpha) is selected, $0<\alpha<1$. Upon the provision of m, for the i-th time, by participant $P_i$, split an amount of K among the i participants that have mentioned m thus far, so that $P_j$ is paid $\alpha$ times the wage of $P_{\{j-1\}}$ which means, because $0<\alpha<1$, that $P_j$ receives a smaller wage than $P_{\{j-1\}}$. As before, all rewards remain pending until m proves acceptable by being mentioned V times.

Formally, let $A_i$ denote the sum $1+\alpha+\alpha^2+\ldots+\alpha^{\{i-1\}}=(1-\alpha^i)/(1-\alpha)$, and $W_{\{i,j\}}$, for $j=1, 2, \ldots, i$, the weighted portion $(K/A_i)*\alpha^{\{j-1\}}$ of K. Once m is provided for the i-th time, $P_j$, for $j=1, 2, \ldots i$, is rewarded with:
0 plus a pending reward of $W_{\{i,j\}}$ for $i<v$
$W_{\{j,j\}}+W_{\{j+1,j\}}+\ldots+W_{\{i,j\}}$ for $i=v$ (materializing all the pending rewards)
$W_{\{i,j\}}$ for $i>v$ Properties of this example formula:
(1) For $\alpha=1$, this generalization coincides with the original policy with the equal split of reward policy.
(2) The system pays a total amount of K per each provision of a candidate m, which is already or eventually verified, independently of who provides m, or how many time m repeats. In this sense, the policy resembles the known policy described in the background art.
(3) Upon proposing m for the i-th time, $i \geq v$, the total compensation Cj, that Pj, $1 \leq j \leq i$, has gained thus far for m, equals $$W_{\{j,j\}}+W_{\{j+1,j\}}+W_{\{j+2,j\}}+\ldots+W_{\{i,j\}}=K\alpha^{\{j-1\}}\times(1-\alpha)\times\{1/(1-\alpha^j)+1/(1-\alpha^{\{j+1\}})+\ldots+1/(1-\alpha^i)\}$$

(4) Upon proposing m for the i-th time, $i \geq v$, the total compensation $C_{\{j-1\}}$, that $P_{\{j-1\}}$, $1<j\leq i$, has gained thus far for m, is greater than the total compensation $C_j$, that $P_j$ has gained thus far for m, according to:

$$C_{\{j-1\}}=C_j/\alpha+W_{\{j-1,j-1\}}.$$

For fixed $\alpha$ and $i \geq v$, the advantage $C_{\{j-1\}}-C_j$ of $P_{\{j-1\}}$ over $P_j$ decreases with j: $C_{\{j-1\}}-C_j=C_j(1/\alpha-1)+K\alpha^{\{j-2\}}\times(1-\alpha)/(1-\alpha^{\{j-1\}})$, and by Property 4 and because $\alpha<1$, both summands decrease when j grows.

For fixed i, $C_1-C_2$, the dominant decrease by Property 5, is inversely proportional to $\alpha$.

By these properties, the motivation for innovative names may be tuned by controlling $\alpha$. Decreasing $\alpha$ drives for more innovation. Decreasing of $\alpha$ may be employed as the stream of new names seems to weaken.

Figure 4:
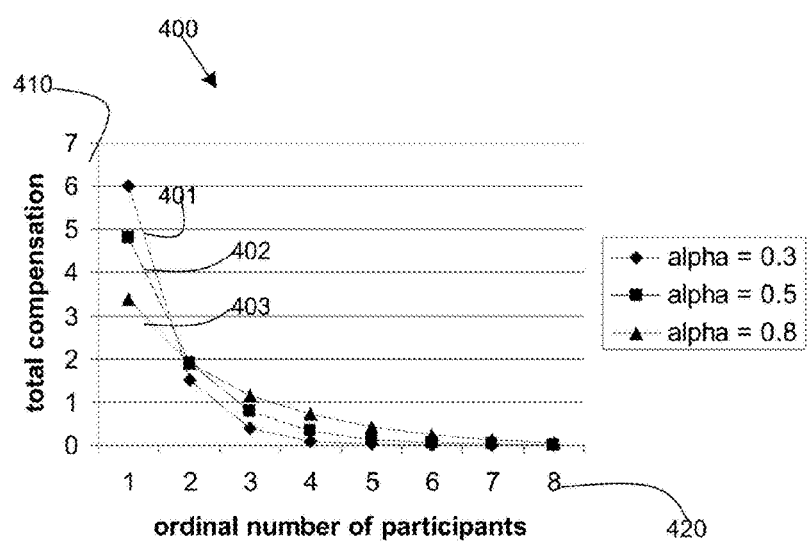
FIG. 4 is a graph showing example results in accordance with the present invention.

Referring to FIG. 4, a graph 400 of example results shows the total compensation 410 for ordinal numbers of participants 420 plotted for three values of alpha: $\alpha=0.3$ shown by curve 401 (with diamond inputs), $\alpha=0.5$ shown by curve 402 (with square inputs), $\alpha=0.8$ shown by curve 403 (with triangle inputs). In the graph, the total compensation $C_j$ participant $P_j$ has gained for naming m is plotted, for $j=1, 2, \ldots, 8$, once m has been named for the i=8th time. It is assumed here that $8>v$, i.e., m is a validated member of the group.

In more detail, the above chart may be described in a table, W, with W[i, j] denoting the reward $P_j$ gains once m is mentioned for the i-th time. Included here payments received on the spot (after m has been validated), as well as payments received with delay (waiting for m to be validated). K is assumed to be 1.

alpha=0.3
W[1, 1]=1.000 W[2, 2]=0.231 W[3, 3]=0.065 W[4, 4]=0.019 W[5, 5]=0.006 W[6, 6]=0.002 W[7, 7]=0.001 W[8, 8]=0.000
W[2, 1]=0.769 W[3, 2]=0.216 W[4, 3]=0.064 W[5, 4]=0.019 W[6, 5]=0.006 W[7, 6]=0.002 W[8, 7]=0.001
W[3, 1]=0.719 W[4, 2]=0.212 W[5, 3]=0.063 W[6, 4]=0.019 W[7, 5]=0.006 W[8, 6]=0.002
W[4, 1]=0.706 W[5, 2]=0.211 W[6, 3]=0.063 W[7, 4]=0.019 W[8, 5]=0.006
W[5, 1]=0.702 W[6, 2]=0.210 W[7, 3]=0.063 W[8, 4]=0.019
W[6, 1]=0.701 W[7, 2]=0.210 W[8, 3]=0.063
W[7, 1]=0.700 W[8, 2]=0.210
W[8, 1]=0.700
total compensations:
W[*, 1]=5.997 W[*, 2]=1.499 W[*, 3]=0.380 W[*, 4]=0.095 W[*, 5]=0.023 W[*, 6]=0.005 W[*, 7]=0.001 W[*, 8]=0.000
alpha=0.5
W[1, 1]=1.000 W[2, 2]=0.333 W[3, 3]=0.143 W[4, 4]=0.067 W[5, 5]=0.032 W[6, 6]=0.016 W[7, 7]=0.008 W[8, 8]=0.004
W[2, 1]=0.667 W[3, 2]=0.286 W[4, 3]=0.133 W[5, 4]=0.065 W[6, 5]=0.032 W[7, 6]=0.016 W[8, 7]=0.008
W[3, 1]=0.571 W[4, 2]=0.267 W[5, 3]=0.129 W[6, 4]=0.063 W[7, 5]=0.031 W[8, 6]=0.016
W[4, 1]=0.533 W[5, 2]=0.258 W[6, 3]=0.127 W[7, 4]=0.063 W[8, 5]=0.031
W[5, 1]=0.516 W[6, 2]=0.254 W[7, 3]=0.126 W[8, 4]=0.063
W[6, 1]=0.508 W[7, 2]=0.252 W[8, 3]=0.125
W[7, 1]=0.504 W[8, 2]=0.251
W[8, 1]=0.502
total compensations:
W[*, 1]=4.801 W[*, 2]=1.901 W[*, 3]=0.784 W[*, 4]=0.320 W[*, 5]=0.127 W[*, 6]=0.047 W[*, 7]=0.016 W[*,8]=0.004
alpha=0.8
W[1, 1]=1.000 W[2, 2]=0.444 W[3, 3]=0.262 W[4, 4]=0.173 W[5, 5]=0.122 W[6, 6]=0.089 W[7, 7]=0.066 W[8, 8]=0.050
W[2, 1]=0.556 W[3, 2]=0.328 W[4, 3]=0.217 W[5, 4]=0.152 W[6, 5]=0.111 W[7, 6]=0.083 W[8, 7]=0.063
W[3, 1]=0.410 W[4, 2]=0.271 W[5, 3]=0.190 W[6, 4]=0.139 W[7, 5]=0.104 W[8, 6]=0.079
W[4, 1]=0.339 W[5, 2]=0.238 W[6, 3]=0.173 W[7, 4]=0.130 W[8, 5]=0.098
W[5, 1]=0.297 W[6, 2]=0.217 W[7, 3]=0.162 W[8, 4]=0.123
W[6, 1]=0.271 W[7, 2]=0.202 W[8, 3]=0.154
W[7, 1]=0.253 W[8, 2]=0.192
W[8, 1]=0.240
total compensations:

W[*, 1]=3.366 W[*, 2]=1.893 W[*, 3]=1.159 W[*, 4]=0.717 W[*, 5]=0.435 W[*, 6]=0.250 W[*, 7]=0.129 W[*, 8]=0.050

The described payment policy has two main advantages.

Firstly, participants are encouraged to increase the coverage of the group by providing new innovative items that were not provided already by others. For example, while labeling an image under a traditional payment policy, people tend to provide the most conspicuous objects in the picture. Therefore, the same obvious answers are often received provided many times by different participants while non-trivial, less known members of the group, may not be suggested by the crowd.

Secondly, participants are encouraged to provide "correct" items. Generally if there is no reward for correct items, many false answers can be expected, which with the above task means wrong members of the group.

A scoring of crowd-computing input system may be provided as a service to a customer over a network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for scoring of crowd-computing inputs, the method comprising:
   receiving an input by a participant, wherein the input is a name of a candidate member in a given group;
   counting, by at least one processor, multiple inputs of the same name of the candidate member by participants;
   determining that a result of said counting is above a predetermined validation threshold;
   validating the name of the candidate member;
   prior to said validating, providing a pending reward of a set size for each instance of an un-validated name of the candidate member, with a higher pending reward for participants who input the name of the candidate member earlier than other participants; and
   following said validating:
      supplying the pending reward to participants who input the validated name of the candidate member, and
      supplying rewards of a set size to participants who input the validated name of the candidate member after said validating.

2. The method as claimed in claim 1, wherein supplying the rewards of set size continues for each new instance of an input of a validated candidate member.

3. The method as claimed in claim 1, wherein supplying the rewards of set size is discontinued after a defined number of instances of an input of the name of the candidate member have been received.

4. The method as claimed in claim 1, wherein supplying the rewards to participants who input the name of the candidate member after said validating, divides the rewards equally between the participants.

5. The method as claimed in claim 1, wherein supplying the rewards to participants who input the name of the candidate member after said validating, divides the rewards according to the order in which the participants provided the input of the name of the candidate member so that participants with earlier inputs are rewarded more than participants with later inputs.

6. The method as claimed in claim 5, including:
   providing a factor $\alpha$ (alpha) where $0 < \alpha < 1$ and supplying the rewards such that a later inputting participant is paid the amount of the previous inputting participant multiplied by the factor.

7. The method as claimed in claim 6, including:
   tuning the factor to provide different levels of reward for earlier inputting participants.

8. A computer program product for scoring of crowd-computing inputs, the computer program product comprising:
   a non-transitory computer readable storage medium storing computer readable program code, the computer readable program code, upon execution by a computer system, causes the computer system to perform a method comprising:
      receiving an input by a participant, wherein the input is a name of a candidate member in a given group;
      counting multiple inputs of the same name of the candidate member by participants;
      determining that a result of said counting is above a predetermined validation threshold;
      validating the name of the candidate member;
      prior to said validating, providing a pending reward of a set size for each instance of an un-validated name of the candidate member, with a higher pending reward for participants who input the name of the candidate member earlier than other participants; and
      following said validating:
         supplying the pending reward to participants who input the validated name of the candidate member, and
         supplying rewards of a set size to participants who input the validated name of the candidate member after said validating.

9. A system for scoring of crowd-computing inputs, comprising:
   a processor configured to perform a method comprising:
   receiving an input by a participant, wherein the input is a name of a candidate member in a given group;
   counting multiple inputs of the same name of the candidate member by participants,
   determining that a result of said counting is above a predetermined validation threshold;
   validating the name of the candidate member;
   prior to said validating, providing a pending reward of a set size for each instance of an un-validated name of the candidate member, with a higher pending reward for participants who input the name of the candidate member earlier than other participants; and
   following said validating:
      supplying the pending reward to participants who input the validated name of the candidate member, and
      supplying rewards of a set size to participants who input the validated name of the candidate member after said validating.

10. The system as claimed in claim 9, wherein said processor is further configured to perform:
    setting one or more of the group of: the validation threshold, a reward amount for each input of a candidate member, a tuning factor for division of the reward between participants, and a limit on the number of rewarded input occurrences.

11. The system as claimed in claim 9, wherein supplying the rewards of set size continues for each new instance of an input of a validated candidate member.

12. The system as claimed in claim 9, wherein supplying the rewards of set size is discontinued after a defined number of instances of an input of the name of the candidate member have been received.

13. The system as claimed in claim 9, wherein supplying the rewards to participants who input the name of the candidate member after said validating, divides the rewards equally between the participants.

14. The system as claimed in claim 9, wherein supplying the rewards to participants who input the name of the candidate member after said validating, divides the rewards according to the order in which the participants provided the input of the name of the candidate member so that participants with earlier inputs are rewarded more than participants with later inputs.

15. The system as claimed in claim 14, including:
    providing a factor $\alpha$ (alpha) where $0 < \alpha < 1$ and supplying the rewards such that a later inputting participant is paid the amount of the previous inputting participant multiplied by the factor.

16. The system as claimed in claim 15, including:
    tuning the factor to provide different levels of reward for earlier inputting participants.

* * * * *